United States Patent [19]

Benton et al.

[11] 4,415,225
[45] Nov. 15, 1983

[54] METHODS OF MAKING HOLOGRAPHIC IMAGES

[75] Inventors: Stephen A. Benton, Lincoln, Mass.; William R. Houde-Walter, Rochester, N.Y.; Herbert S. Mingace, Jr., Manomet, Mass.

[73] Assignee: Polaroid Corporation, Cambridge, Mass.

[21] Appl. No.: 205,758

[22] Filed: Nov. 10, 1980

[51] Int. Cl.³ .............................................. G03H 1/24
[52] U.S. Cl. .................................. 350/3.84; 350/3.85
[58] Field of Search ................... 350/3.83, 3.84, 3.85, 350/3.86

[56] References Cited

U.S. PATENT DOCUMENTS 3,633,989  1/1972  Benton .......................... 350/3.84 X

OTHER PUBLICATIONS

Benton, S. A. et al., "One-Step White-Light Transmission Holography", SPIE, vol. 212, Optics and Photonics Applied to Three Dimensional Imagery (1979), pp. 1–7.

Chen, H., and Yu, F. T. S., "One Step Rainbow Hologram", *Optics Letters*, vol. 2, No. 4, Apr. 1978, Bua.
Chen, Tai, and Yu, "Generation of Color Images with One-Step Rainbow Holograms", *Applied Optics*, vol. 17, No. 10, May 1978, pp. 1490–1491.

*Primary Examiner*—Bruce Y. Arnold

[57] ABSTRACT

A process of making holographic images comprising the steps of recording a hologram of a parallax limited aerial image formed by a lens on a recording surface with a reference beam at an angle of incidence to the recording surface that is preferably equal and opposite to the angle of incidence of the object beam to the recording surface, and illuminating the hologram with a beam of diverging or collimated light, preferably at the angle of incidence of the object beam to the recording surface and directed oppositely to the direction of the object beam during recording. Illumination can be with white light. The hologram may comprise superposed recordings of the aerial image made with light of different wavelengths to produce full color holographic images.

20 Claims, 7 Drawing Figures

METHODS OF MAKING HOLOGRAPHIC IMAGES

This invention relates to holography, and more particularly to methods and apparatus for producting orthoscopic holographic images by white light transmission.

Holographic images of an object are said to be orthoscopic if conforming to the object in proportions and depth relations, and pseudoscopic if the depth relations are reversed relative to the object so that the image appears as an inside-out version of the object. Orthoscopic images are clearly to be preferred for most practical purposes.

U.S. Pat. No. 3,633,989 describes two processes for making orthoscopic holographic images. One of these involves the preparation of a parallax limited hologram, which upon illumination with a monochromatic beam conjugate to the reference beam used in recording yields a real pseudoscopic image (incorrectly described as orthoscopic in the patent). This real image is then holographically recorded to form a second hologram. The second hologram, when illuminated by a beam conjugate to the reference beam used in recording it, yields a real orthoscopic image. Good image quality can be produced by this process, but the requirement for two holographic recording steps is somewhat onerous.

The second approach described in U.S. Pat. No. 3,633,989 comprises holographically recording an aerial image of a scene or object formed by a lens provided with an elongated slit aperture with the aid of a diverging reference beam. Illumination of the hologram so formed with a converging beam conjugate to the source produces a real image of the slit aperture through which a real orthoscopic image of the scene or object can be viewed. The large converging lens required to form the illumination beam makes this process impractical for some purposes and the orthoscopic image is less bright than would be desirable; e.g., the pseudoscopic image that can be viewed by looking toward the hologram from an appropriate position is considerably brighter than the orthoscopic image.

Various other methods of orthoscopic imaging have been proposed. In an article entitled "One Step Rainbow Hologram" by Chen and Yu, appearing in *Optics Letters*, Vol. 2, No. 4, pp 85–87, April, 1978 a process is described in which a slit aperture is placed between an object and a lens. The lens images the object ahead of a plate on which a hologram is recorded, and the slit is imaged behind the plate. Upon viewing with an illumination beam corresponding to the original reference beam, but of white light, an orthoscopic image of the object can be seen through the slit image. In "Generations of Color Images With One-Step Rainbow Holograms," *Applied Optics*, Vol. 17, No. 10, May 15, 1978, Chen, Tai and Yu point out that sequential holographic recordings of an aerial image of an object in this manner on the same plate, with monochromatic light of three different colors, can be made to produce a full color image with white light illumination. However, the size of the image of the object is limited due to vignetting by the lens aperture.

In accordance with my invention, a parallax limited holographic image of an aerial image of an object formed by a lens is recorded on a photographic plate, preferably using a diverging reference beam from a point source at an angle of incidence to the plate equal and opposite to the angle of incidence of a ray along the optical axis of the lens. If a full color image is desired, three such recordings may be superposed on the same plate, using three monochromatic light sources of different wavelengths, and the same recording geometry. For purposes requiring the holographic image to be correctly oriented from left to right, a mirror is placed in the optical path between the scene and the lens.

After the exposed plate has been processed, a hologram is formed which may be viewed by white light to produce rainbow images, in which the images are seen in a different color at different positions of the observer in a viewing zone, or in full color, varying in color balance with the position of the observer in the viewing zone. Both pseudoscopic and orthoscopic images can be viewed from different viewing zones. Preferably, the illumination beam is directed toward the hologram from the side opposite the side toward which the object and reference beams were directed during recording. The reference beam is preferably from a diverging or collimated source, which may be an incandescent light, or the sun. Most preferably, the illumination beam is directed toward the plate at an angle of incidence to the plate equal to the angle of incidence of the optical axis of the lens to the plate during recording.

The invention will best be understood in the light of the following description, together with the accompanying drawings.

Figure 1:
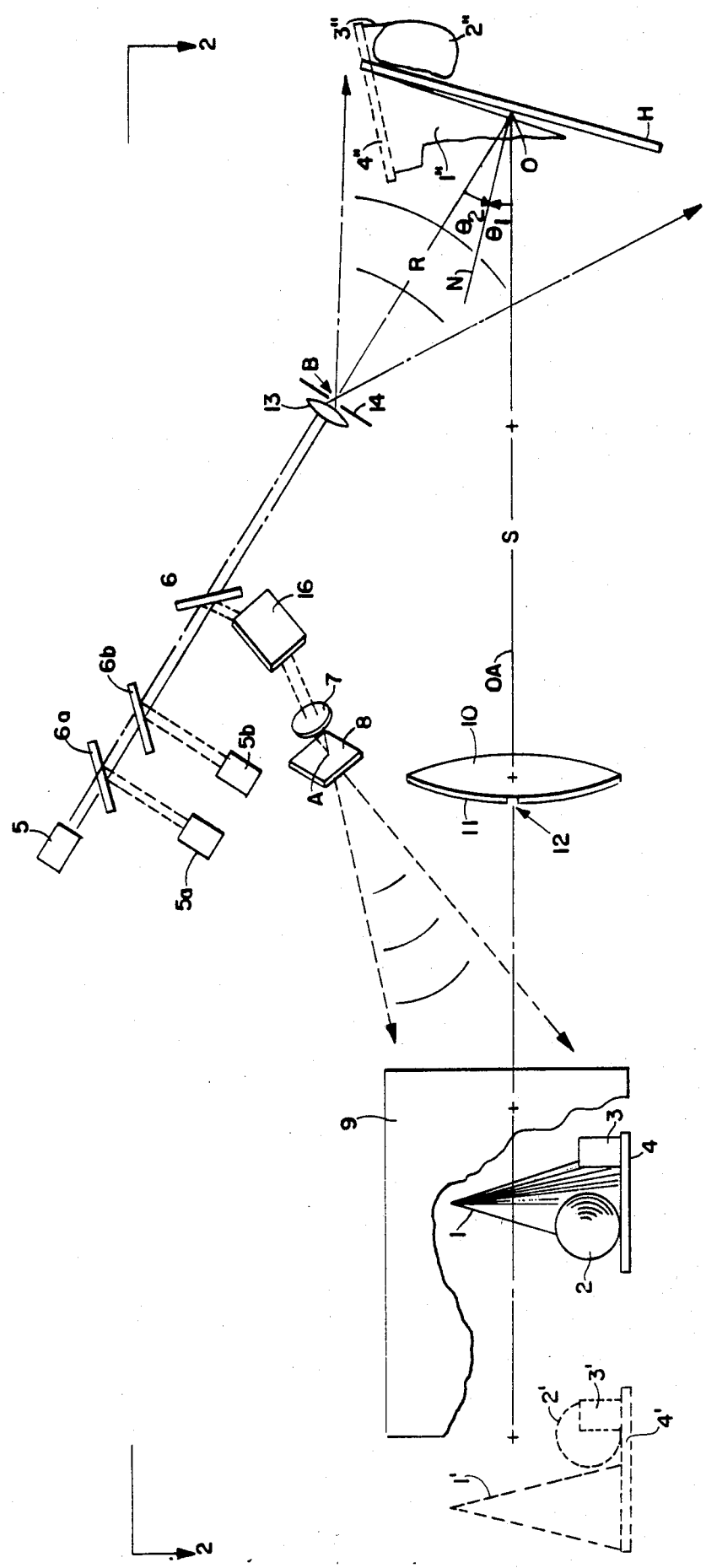
FIG. 1 is a schematic and diagrammatic elevational sketch of apparatus used in recording a hologram in accordance with the invention, with parts broken away, as seen essentially along the lines 1—1 in FIG. 2.
Figure 2:
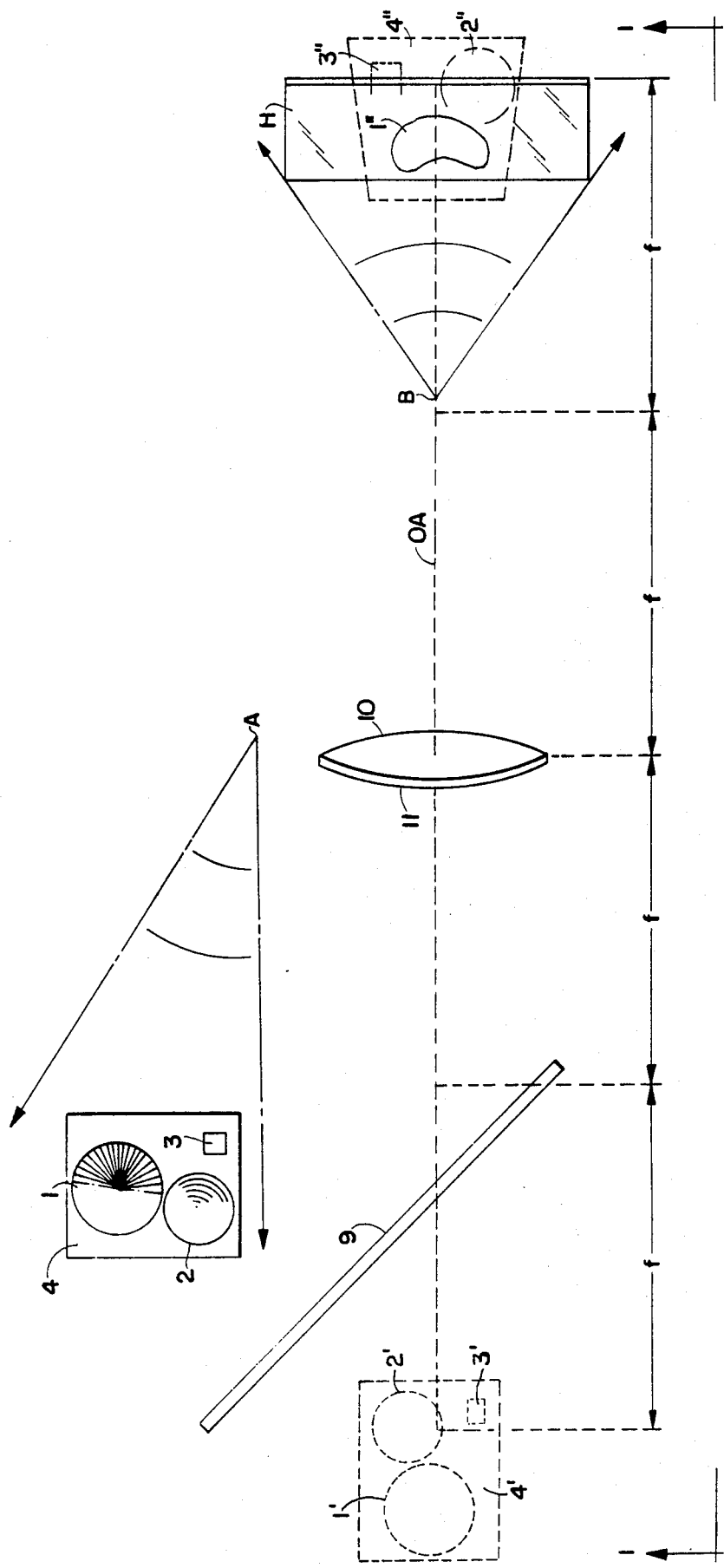
FIG. 2 is a plan view of the apparatus of FIG. 1, as seen essentially along the lines 1—1 in FIG. 1, with parts omitted.

Referring first to FIGS. 1 and 2, apparatus is shown for holographically recording an aerial image of a scene comprising a cone 1, a sphere 2 and a rectangular block 3 on a base 4. A monochromatic light source, such as a laser 5 (FIG. 1), provides coherent object and reference beams for recording by division of the primary beam with a beam splitter 6 in the conventional manner. If desired for polychromatic recording in a manner to be described below, additional lasers 5a and 5b may be positioned to form beams in a common path with the aid of beam splitters 6a and 6b in the path of the beam from the laser 5 to the laser 6, as shown.

As shwon in FIG. 1, an object beam reflected from the beam splitter 6 and appropriately redirected by a mirror 16 is formed to approximate a point source at A by a lens 7 focused on a pinhole in a mask 8. Light from the point source so formed illuminates the objects 1, 2, 3 and 4.

A mirror 9 having a reflecting surface facing the objects 1-4 forms a virtual image 1', 2', 3', 4' of the objects. A lens 10 having an optical axis OA at a 45° angle to the plane of the mirror 9 forms an aerial image 1", 2", 3", 4" of the objects that is inverted relative to the objects and their virtual image, and is distorted by the differences in magnification at different distances from the lens so that, for example, the virtual image 1', which is farther from the lens than the image 2', forms an aerial image 1" that is closer to the lens than the aerial image 2" and relatively smaller. The aerial images are shown interrupted because they only conform to portions of the objects 1-4 that can be seen in the mirror 9 from the location of the lens 10.

While not necessary to the practice of the invention, the recording arrangement shown is that appropriate for 1:1 imaging, with the lens 10 being focused on a plane in the scene at a distance 2f from the appropriate principal plane of the lens, shown for simplicity as at the center of the lens, where f is the focal length of the lens. The distortion in the aerial image formed by the lens would thus be appreciably greater than that shown for a scene of comparable depth to that formed by the objects 1-4. The aerial image formed by the lens 10 is limited in parallax by restricting the field of view to an elongated slit aperture, as by a mask 11 formed with an elongated slit aperture 12 (FIG. 1).

The distorted aerial images 1"-4" are formed in a region straddling a plane at 2f from the lens. A hologram of these aerial images is recorded on an initially unexposed photographic plate H having its emulsion on the side confronting the lens 10.

A reference beam for the holographic recording is provided by a portion of the beam from the laser 5 transmitted by the beam splitter 6 and focused by a lens 13 onto a pinhole in a mask 14, as shown in FIG. 1, to approximate a point source at B.

The optical axis OA intersects the emulsion on the plate 8 at a point O. The plate H is preferably tipped so that the optical axis is at an angle of incidence $\theta_1$ to a normal N to the plate through the point O. The reference beam from the source at B is directed toward the plate H at an angle of incidence $\theta_2$. As shown in FIG. 1, the source at B is located at a distance R from point O, and the slit 12 is at a distance S (the optical path distance) from the point O. The factors governing the choice of the parameters R, S, $\theta_1$ and $\theta_2$ in recording will be considered below.

The plate H may be given a single exposure with a source at a desired wavelength, to form a rainbow white light transmission hologram, or three exposures at different wavelengths to form a full color white light transmission hologram. After exposure in either fashion, and processing in the conventional manner, preferably by development, fixing and bleaching to form a holographic image modulated in index of diffraction, the hologram can be viewed under conditions to be considered below to yield images of varied characteristics.

If desired, the mirror 9 may be omitted, and the objects 1-4 located where their virtual images 1'-4' are shown in FIGS. 1 and 2. In this case, the orthoscopic images produced in the manner to be described would be reversed from left to right.

For binocular viewing of a 1:1 image at arm's length, the lens should have an aperture of at least f3.5. The Kodak Aero-Ektar with a focal length of 12 inches and an aperture of f2.5 is well suited for this purpose.

The images which may be viewed upon illumination of a parallax limited hologram made with an object beam passing through a narrow slit and focused by a lens in a region straddling a photographic plate, using a reference beam formed as a point source on the same side of the plate, are seen through slit images located as will next be described in connection with FIGS. 3, 4, 5, 6 and 7.

Figure 3:
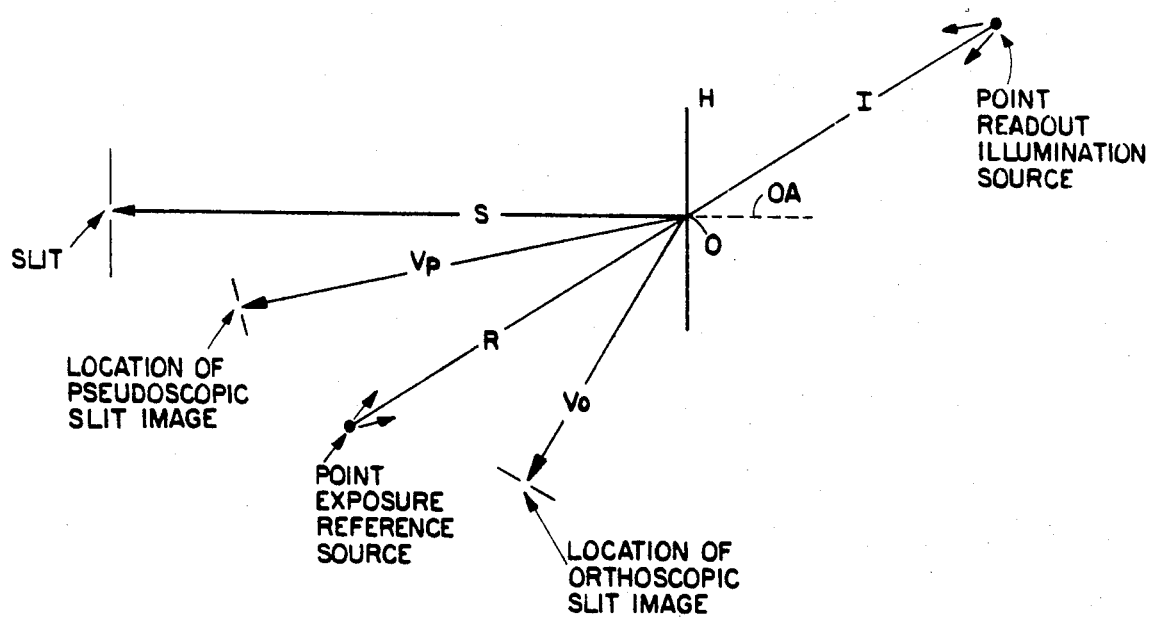
FIG. 3 is a schematic diagram illustrating distance relationships between object and reference beams in recording, and the illumination beam and viewing locations in reproduction, relative to the plane of a hologram recorded with the apparatus of FIGS. 1 and 2.

Referring first to FIG. 3, if the slit in the mask covering the lens is at a distance S along the optical axis OA from the plate H on which the hologram is exposed, and the reference beam is a point source located at a distance R from a point O at the intersection of the optical axis with the plate H, two equivalent focal lengths Fo and Fp are determined for the plate as $$\frac{1}{Fo} = \frac{1}{R} - \frac{1}{S} \tag{1}$$

and $$\frac{1}{Fp} = \frac{-1}{Fo} = \frac{1}{S} - \frac{1}{R} \tag{2}$$

When the hologram is exposed with a light source having a wavelength $\lambda_1$, developed, fixed and preferably bleached, and illuminated with a readout illumination source having a wavelength $\lambda_2$ and formed as a point source at a distance I from the intersection of the optical axis with the plate H, an orthoscopic image of the original subject may be viewed through a slit image located at a distance Vo from the point O given by $$\frac{1}{Vo} = \frac{\lambda_2}{\lambda_1 Fo} - \frac{1}{I} \tag{3}$$

For conciseness, this image will be referred to as the orthoscopic slit image.

Another order of diffraction forms a slit image, referred to hereinafter as the pseudoscopic slit image, through which a pseudoscopic image can be viewed, located at a distance Vp from the point O given by $$\frac{1}{Vp} = \frac{\lambda_2}{\lambda_1 Fp} - \frac{1}{I} \tag{4}$$

Substituting for Fo and Fp from Equations (1) and (2) into Equations (3) and (4), respectively, one obtains $$\frac{1}{Vo} = \frac{\lambda_2}{\lambda_1}\left(\frac{1}{R} - \frac{1}{S}\right) - \frac{1}{I} \tag{5}$$

and $$\frac{1}{Vp} = \frac{\lambda_2}{\lambda_1}\left(\frac{1}{S} - \frac{1}{R}\right) - \frac{1}{I} \tag{6}$$

The distance S in Equations (5) and (6) may always be taken as positive. The distances R and I, when positive, represent diverging beams located on opposite sides of the plate H as shown in FIG. 3. A negative value of R would represent a source converging to a point along the axis of propogation of the reference beam on the other side of the plate H, requiring a large converging lens to form the reference beam. Similarly, a negative value of I would correspond to an illumination beam converging to a point on the left of the plate H as seen in FIG. 3, requiring a large converging lens to form the illumination beam. Since it is usually desirable to avoid the use of large lenses in either exposure or viewing, positive values of both R and I are preferred.

The distances Vo and Vp are preferably positive. Negative values of these distances, arising from an inappropriate choice of the other parameters in FIG. 3, correspond to virtual slit images that badly vignette the desired images of the scene. Accordingly, only positive values of these distances will be considered in the following discussion.

Since Equations (5) and (6) above are independent of the choice of distance units, they may be simplified by adopting distances normalized to S as follows:

$$vo = Vo/S$$

$$vp = Vp/S$$

$$i = I/S$$

$$r = R/S$$

Substituting the normalized distances into Equations (5) and (6), upon rearranging and simplifying one obtains $$\frac{1}{vo} = \frac{\lambda_2}{\lambda_1}\left(\frac{1}{r} - 1\right) - \frac{1}{i} \quad (7)$$

and $$\frac{1}{vp} = \frac{\lambda_2}{\lambda_1}\left(1 - \frac{1}{r}\right) - \frac{1}{i}, \quad (8)$$

respectively.

Since the discussion is restricted to $1/vo > 0$ for the reasons given above, for the orthoscopic case in which i and r are both positive Equation (7) implies both that $1/r > 1$ and that $\lambda_2/\lambda_1 r > 1/i$. Thus, $0 < r < 1$ and $\lambda_2 r/\lambda_1 < i$. These are the preferred ranges of the parameters for orthoscopic viewing. Similarly, for the pseudoscopic case in which i, r and vp are all positive, Equation (8) implies that $1/i < \lambda_2/\lambda_1$ and $1/r < 1$; thus, $i > \lambda_1/\lambda_2$ and $r > 1$. Accordingly, if i and r are both positive and the orthoscopic slit image is real, the pseudoscopic slit image will be virtual, and vice-versa.

The case in which both i and r are negative is of no interest here, both because the orthoscopic slit image would be virtual, and because large converging lenses would be required both for exposure and for viewing.

One of the cases in which one of i and r is negative and the other is positive is of some interest. In particular, if $i > 0$ and $r = -ai$, where a is any positive real number, for $vp > 0$ Equation (8) implies that $i > (\lambda_1/\lambda_2) - a$ and $\lambda_1/\lambda_2 > a$, but from Equation (7) it is clear that only virtual orthoscopic slit images can be formed in this case. On the other hand, if $r > 0$ and $i = -br$, where b is any positive real number, for $vo > 0$ Equation (7) implies that $r < 1 + (\lambda_1/\lambda_2 b)$, whereas for $vp > 0$, Equation (8) implies that $r > 1 - (\lambda_1/b\lambda_2)$ and $b > (\lambda_1/\lambda_2)$.

Thus, the orthoscopic and pseudoscopic images will both be real for $b > (\lambda_1/\lambda_2)$ and $1 - (\lambda_1/\lambda_2 b) < r < 1 + (\lambda_1/\lambda_2 b)$.

Viewing through the orthoscopic slit image as described in my U.S. Pat. No. 3,633,989 illustrates the special case in which $r > 0$ and $i = -r$, corresponding to $b = 1$ in the above inequalities. In this case, the illumination beam converges on the point source forming the diverging reference beam, thus making the onerous requirement for a large converging lens to form the illumination beam.

The normalized distances i and r are preferably chosen within the ranges bounded as described above such that, for diverging beams, the required included angle is less than about 19°. The reference beam may be collimated ($r = \infty$), but the large collimator required for that purpose is not necessary because a diverging beam formed with a small lens can be used with the same results if an appropriate choice of i is made. On the other hand, a collimated illumination beam ($i = \infty$) may be preferred, since sunlight can be used for illumination, though not for exposure. For orthoscopic viewing, the values of i and r are preferably also chosen so that $vo = 1$ ($Vo = S$), because this is the only distance at which the view through the slit image will be without perspective distortion. However, moderate variations above or below this value which may be made for practical reasons may cause no objectionable perspective distortion, and in some instances extreme perspective distortion may be desired.

Confining attention to the case of orthoscopic viewing, and to the case in which both i and r are positive, $\lambda_1 = \lambda_2$ and $vo = 1$, from Equation (7) above, $$r = \frac{1}{2 + \frac{1}{i}} \quad (7a)$$

The largest value of r is given by $$\lim_{i \to \infty} r = \frac{1}{2} \quad (7b)$$

for smaller values of i, r is given by $$r = \frac{i}{2i + 1} \text{ in the range } 0 < r < \frac{1}{2} \quad (7c)$$

As noted above, $i = \infty$ may be a convenient value if sunlight is to be used for viewing illumination. And it is not desirable to have r too short, because the required included beam angle might be too large, or the required source location might intrude into the path of the object beam. However, with values of i of, say, 5 or more, which are attainable with a point source at a convenient distance and a converging lens of modest proportions, r will still be reasonably near $\frac{1}{2}$.

More generally, if $vo = 1$ when $(\lambda_2/\lambda_1) = p$, from Equation (7), $$1 = p\left(\frac{1}{r} - 1\right) - \frac{1}{i}$$

Rearranging, $$\frac{1}{r} - 1 = \frac{1}{p} + \frac{1}{pi} \quad (7d)$$

Substituting this value of $(1/r) - 1$ into Equation (7), $$\frac{1}{vo} = \frac{\lambda_2}{p\lambda_1}\left(1 + \frac{1}{i}\right) - \frac{1}{i} \tag{7e}$$

A choice of i and r such that p≠1 would require the use of different monochromatic sources for recording and viewing at the optimum location, but would permit the shifting of the white light illumination response of a polychromatic hologram in a manner to be described below. A value of p>1 would permit a somewhat larger value of r for a given value of i; e.g., for p=1.5, i=1, r=3/7, whereas for p=1, i=1, r=⅓.

The above considerations are adequate for the formation of viewable images, but not for the formation of images of convenient location or orthoscopic images of optimum brightness. The angular location of the slit images with respect to the normal to the plane of the hologram as a function of the angles of incidence of the object and reference beams to the hologram during recording will next be considered with reference to FIGS. 3, 4 and 5.

Figure 4:
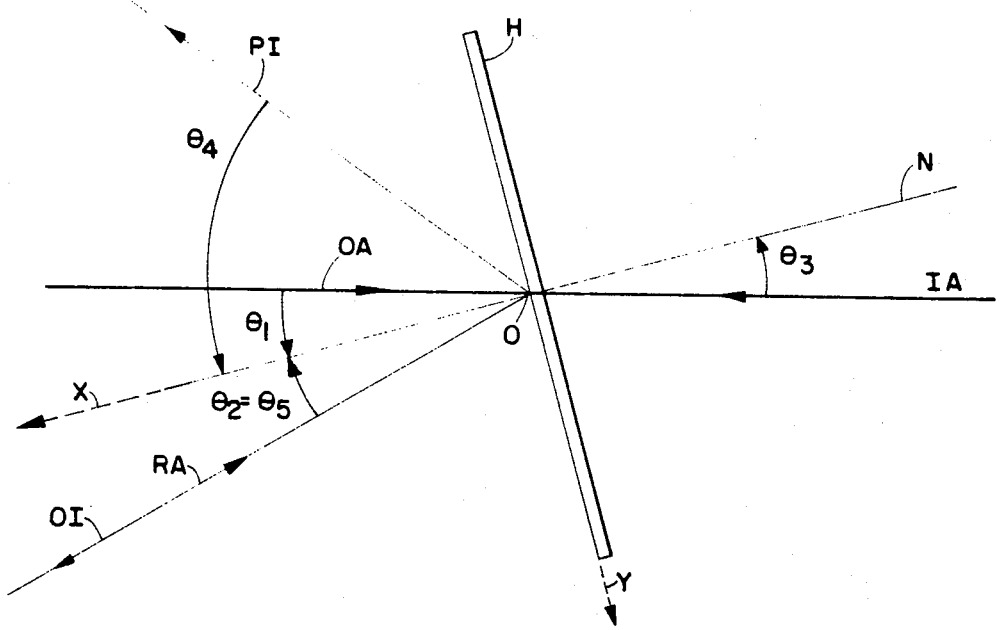
FIG. 4 is a diagram similar to FIG. 3 but illustrating angular relationships relative to the plane of a hologram recorded with the apparatus of FIGS. 1 and 2.

In FIG. 4, the holographic plate H is shown tipped relative to the optical axis OA, and should be considered inverted relative to the position shown in FIG. 1 so that the image will be seen right side up. All angles are referred to the normal N to the plate H, the angle of incidence of the object beam at the optical axis being $\theta_1$, where $\theta_1=0$ for the case shown in FIG. 3. It should be noted that the angle of incidence of the object beam is the angle of incidence to the plate H of a ray emanating from a hypothetical point source at the center of the slit aperture (such as 12 in FIG. 1), which ray intersects the plate H at its center. This ray coincides with the optical axis OA in the case shown in FIGS. 1 and 2, where the slit is centered on the optical axis. If the slit was not centered on the optical axis, which is by no means necessary, $\theta_1$ should be measured as just described. However, for clarity of exposition in the following discussion, the slit will be assumed to be on the optical axis of the lens.

The angle of incidence of the reference beam in exposure is $\theta_2$, and the angle of incidence of the illumination beam is $\theta_3$, the reference and illumination beams being generally directed toward the plate H along axes RA and IA that are not necessarily coincident, as will appear. Angles will be taken as positive or negative according as a clockwise or counterclockwise rotation, respectively, would carry the axis into the normal.

For recording, it can be shown that $$f = \frac{\sin \theta_2 - \sin \theta_1}{\lambda_1} \tag{9}$$

where $\lambda_1$ is the wavelength of the light used in recording, and f is the spatial frequency of the recording in corresponding units of cycles per unit length.

On playback of the hologram with an illuminating beam at the angle $\theta_3$, the pseudoscopic slit image will be located along an axis PI at an angle $\theta_4$ to the normal N given by $$\sin \theta_4 = \sin \theta_3 - \lambda_2 f \tag{10}$$

where $\lambda_2$ is the wavelength of the illuminating beam and f is the spatial frequency established on recording and given by Equation (9) above, whence $$\sin \theta_4 = \frac{\lambda_2}{\lambda_1}(\sin \theta_1 - \sin \theta_2) + \sin \theta_3 \tag{11}$$

Similarly, the orthoscopic image will lie along an axis OI on the other side of the normal N at an angle $\theta_5$ given by $$\sin \theta_5 = \sin \theta_3 + \lambda_2 f \tag{12}$$

where $\lambda_2$ and f have the same significance as before. Thus, $$\sin \theta_5 = \frac{\lambda_2}{\lambda_1}(\sin \theta_2 - \sin \theta_1) + \sin \theta_3 \tag{13}$$

For the case shown in FIG. 3 in which the plate H is normal to the optical axis and the illumination beam is directed oppositely to the reference beam, $\theta_1=0$ and $\theta_2=\theta_3$. With these values, in the important case where $\lambda_2=\lambda_1$, the value of $\theta_4$ is given by Equation (11) as $\theta_4=\theta_1=0$. Thus, the pseudoscopic slit image lies along the optical axis in this case. The orthoscopic image angle $\theta_5$ in this case for any chosen value of $\theta_2$ may be found from Equation (13), and is given for various values of $\theta_2$ below.

| $\theta_2°$ | $\theta_5°$ |
|---|---|
| 10 | −20.32 |
| 20 | −43.2 |
| 25 | −57.7 |
| 30 | −90 |

At increasing values of $\theta_2$, the image of the object seen through the orthoscopic slit image becomes progressively less bright because more light is lost through internal reflections in the hologram plate. At $\theta_2=30°$, the hypothetical orthoscopic slit image at $\theta_5=-90°$ would not be available for viewing.

A better method of recording and viewing is to tip the plate H relative to the optical axis OA for recording at an angle $\theta_1=-\theta$. With the angles of incidence of the object and reference beams being equal and opposite, the interference fringes will be substantially normal to the plate H, resulting in improved diffraction efficiency.

In viewing, one approach is to direct the illumination beam oppositely to the reference beam at the angle $\theta_3=\theta_2$. From Equation (11) with $\lambda_1=\lambda_2$, $\theta_4=\theta_1$, so that the pseudoscopic image is on the optical axis as before. However, from Equation (13), with $\lambda_1=\lambda_2$, the orthoscopic angle $\theta_5=-3\sin \theta_1$; e.g., for $\theta_1=15°$, $\theta_5=-50.94°$.

Surprisingly, it has been found that a better approach for orthoscopic viewing is to direct the illumination beam oppositely to the original object beam. An undistorted view of the object, of greatly enhanced brightness, can be viewed through the orthoscopic slit image so formed if recording is done with object and reference beams at equal and opposite angles of incidence as described above. The brightness of the pseudoscopic image is not affected by this technique. If the object and reference beams are not at equal and opposite angles of incidence, brightness of the orthoscopic image will still be enhanced, but the image will be distorted.

FIG. 4 illustrates recording and viewing relationships for optimum orthoscopic viewing. As illustrated in FIG. 4, recording is done with the photographic plate at H, emulsion side on the left. The object beam (pasing through the slit, not shown) is directed to the right along the optical axis OA at an angle of incidence $\theta_1$. The reference beam is directed upwardly and to the right along the axis RA at an angle $\theta_2$ equal in amplitude and opposite in sign to the angle $\theta_1$.

After processing, the hologram is illuminated with a beam oppositely directed to the original object beam, along an axis IA which is colinear with the axis OA, at an angle of incidence $\theta_3 = \theta_1$. It should be noted that the direction of the original object beam is that direction fixed relative to the plate during recording, which is unchanged by movement of the plate between recording and viewing.

From Equation (13), if $\lambda_2 = \lambda_1$ and $\theta_3 = \theta_1$, $\theta_5 = \theta_2$. Thus, the orthoscopic slit image would be to the left of and below the plate H along an axis OI coincident with the original reference axis. Under the same viewing conditions, from Equation (11), $\sin \theta_4 = 3\sin \theta_1$. Thus, the pseudoscopic slit image would lie above and to the left of the plate H along an axis PI at an angle to the normal N considerably greater than $\theta_5$ in amplitude and opposite in sign.

Equations (7) and (13) locate the orthoscopic image in polar coordinates $v_o$ and $\theta_5$. For convenience in discussing the imaging properties of a hologram under illumination with white light, the image location may be referred to orthogonal axes x and y having an origin at point O in FIG. 4. As indicated in FIG. 4, the x axis is coincident with the normal N, and the y axis is normal to the x axis and in the plane of the image axis OI and the optical axis OA.

Figure 5:
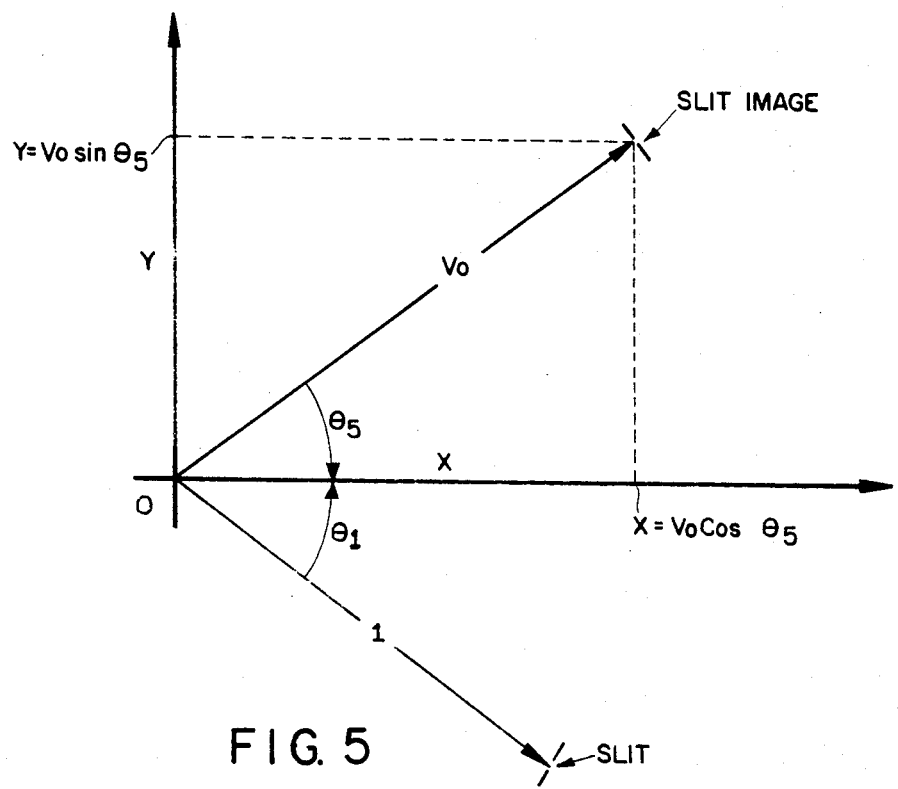
FIG. 5 is a graph relating the relationships illustrated in FIGS. 3 and 4 to a rectangular x, y coordinate system in the plane of FIG. 4.

FIG. 5 shows the slit located at unit distance from the origin at the angle $\theta_1$ to the x axis, and the orthoscopic slit image at the normalized distance $v_o$ from the origin at the angle $\theta_5$. From FIG. 5, it is apparent that $$y = v_o(\sin \theta_5) \quad (14)$$
$$x = v_o(\cos \theta_5) \quad (15)$$

Choosing $\theta_3 = \theta_1$ for optimum image brightness, and choosing $\theta_2 = -\theta_1$ for distortionless viewing, from Equation (13), $$\sin \theta_5 = \left( \frac{2\lambda_2}{\lambda_1} - 1 \right) \sin \theta_2 \quad (13a)$$

Since $\cos \theta_5 = \sqrt{1 - \sin^2 \theta_5}$, $$\cos \theta_5 = \sqrt{1 - \left( \frac{2\lambda_2}{\lambda_1} - 1 \right)^2 \sin^2 \theta_2} \quad (13b)$$

Choosing $i = \infty$, to simplify exposition, it can be shown from Equation (7e) that $$v_o = (p\lambda_1/\lambda_2) \quad (7f)$$

Substituting values of $\sin \theta_5$, $\cos \theta_5$ and $v_o$ from Equations (13a), (13b) and (7f) into Equations (14) and (15), one obtains $$y = \left( 2 - \frac{\lambda_1}{\lambda_2} \right) p(\sin \theta_2) \quad (16)$$

and $$x = p \sqrt{ \left( \frac{\lambda_1}{\lambda_2} \right)^2 - \left( 2 - \frac{\lambda_1}{\lambda_2} \right)^2 \sin^2 \theta_2 } \quad (17)$$

Solving Equation (16) for $(\lambda_1/\lambda_2)$, $$\frac{\lambda_1}{\lambda_2} = 2 - \frac{y}{p(\sin \theta_2)} \quad (16a)$$

Substituting the right side of (16a) for $(\lambda_1/\lambda_2)$ in Equation (17), $$x = p \sqrt{ \left[ 2 - \frac{y}{p(\sin \theta_2)} \right]^2 - \frac{y^2 \sin^2 \theta_2}{p^2 \sin^2 \theta_2} } \quad (18)$$

Carrying out the indicated operations under the radical signs, and rearranging, $$x = p \sqrt{ \frac{y^2}{p^2} \left[ \frac{1}{\sin^2 \theta_2} - 1 \right] - \frac{4y}{p(\sin \theta_2)} + 4 } \quad (18a)$$

Squaring and rearranging, and noting that $$\frac{1}{\sin^2 \theta_2} - 1 = \frac{1}{\tan^2 \theta_2},$$

$$y^2 - \frac{4yp(\tan \theta_2)}{\cos \theta_2} - (x^2 - 4p^2) \tan^2 \theta_2 = 0 \quad (18b)$$

Solving (18b) for y, $$y = \frac{2p(\tan \theta_2)}{\cos \theta_2} \pm \tfrac{1}{2}\sqrt{ \frac{16p^2(\tan^2 \theta_2)}{\cos^2 \theta_2} + 4x^2(\tan^2 \theta_2) - 4p^2(\tan^2 \theta_2) } \quad (19)$$

It can be shown (by substituting values of x and y from Equations (16) and (17) into Equation (19) that at least in the first quadrant with $x > \theta$, $y > \theta$ and $\theta_2 > \theta$, the correct sign in Equation (19) is $(-)$. Adopting this sign, and simplifying with the aid of the trignometric identity $$\frac{1}{\cos^2 \theta_2} - 1 = \tan^2 \theta_2,$$

one obtains $$y = \frac{2p(\tan \theta_2)}{\cos \theta_2} - \tan \theta_2 \sqrt{x^2 + 4p^2 \tan^2 \theta_2} \quad (20)$$

Figure 6:
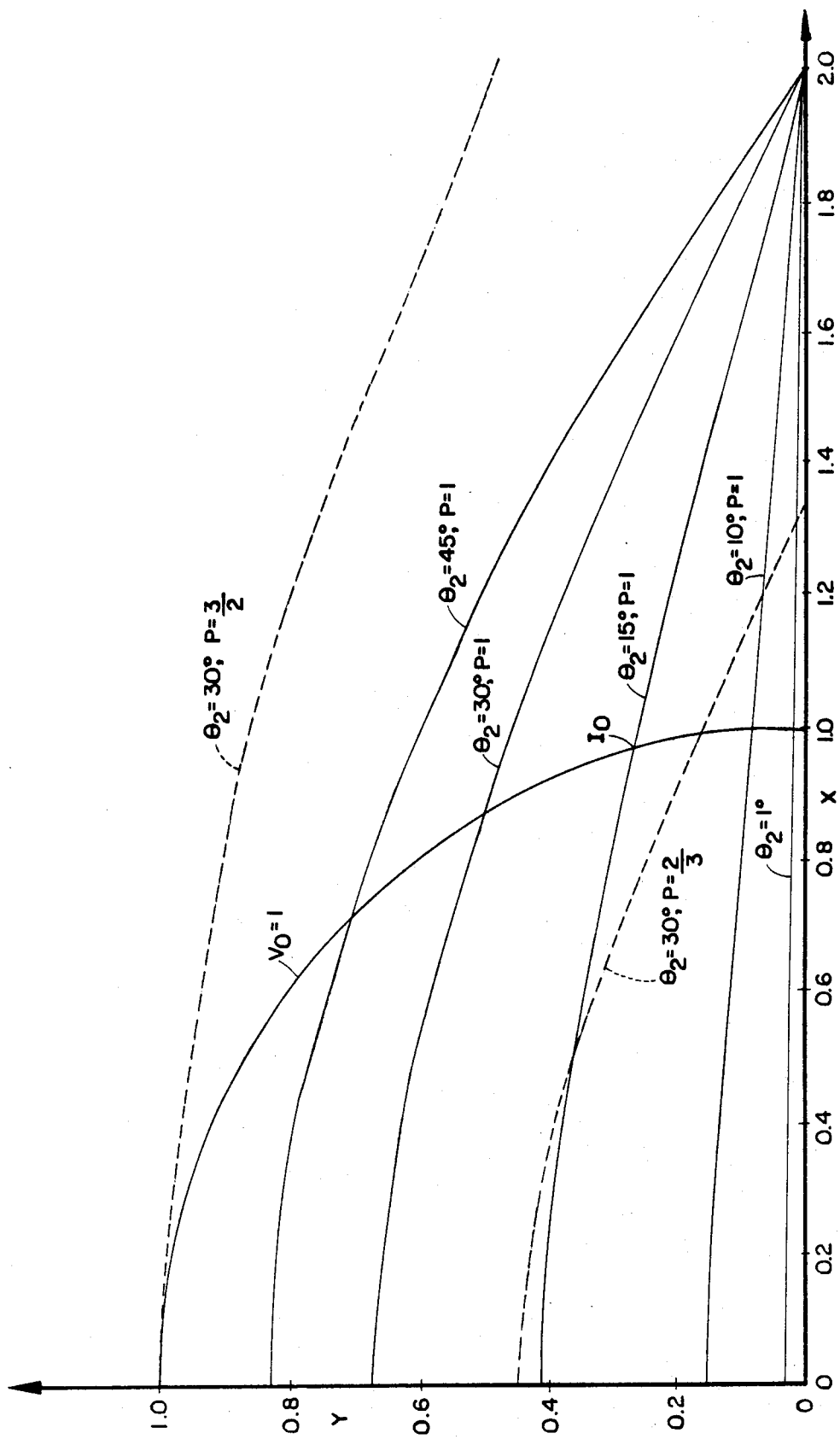
FIG. 6 is a graph of image zone locations in the coordinate system of FIG. 5.

FIG. 6 is a graph of Equation (20) for various values of p and $\theta_2$, together with a graph of the locus of $v_o = 1$. In x, y coordinates for positive values of x and y, the latter is given by $$y = \sqrt{1 - x^2} \quad (21)$$

The curves in solid lines illustrate variations in the locations of the images with variations in $\theta_2$. The curves in dotted lines for $\theta_2=30°$, $p=\frac{2}{3}$, and for $\theta_2=30°$, $p=3/2$, show the strong effect of variations in p.

The curve $vo=1$ is a circle of unit radius centered at the origin of the x, y axes. A slit image will be located at the intersection of this curve with the $y(x)$ curve for the selected value of $\theta_2$, for example, at Io on the curve for $\theta_2=15°$, $p=1$, through which slit image an orthoscopic, undistorted, unvignetted image of the original object can be viewed when the observer is looking toward the origin.

Figure 7:
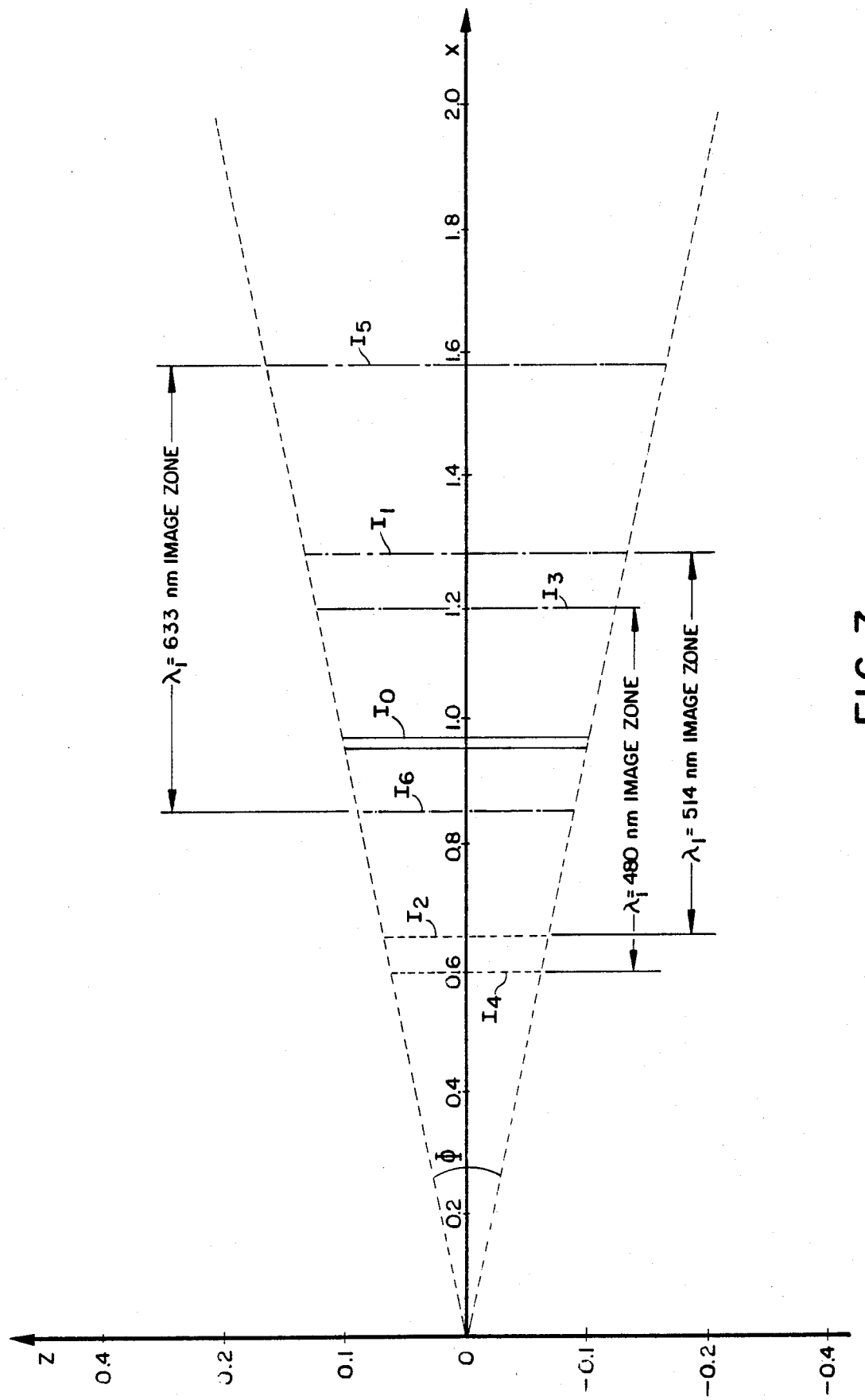
FIG. 7 is a graph of image zones located as shown in FIG. 7 in a rectangular x, z coordinate system in a plane normal to the plane of FIG. 4.

FIG. 7 shows a projection of the slit image Io for the case $\theta_2=15°$, $p=1$, in an x,z plane normal to the x,y plane of FIG. 6. Units of distance along the z axis represent units of width of the slit image normalized to S and centered on the x axis; i.e., if W is the slit width in units of length, $w=W/S$ is the normalized slit width. The particular value of w shown is 0.2, which is approximately the value attainable with an f2.5 lens used at 1:1 magnification.

If a hologram recorded at a wavelength $\lambda_1$ is viewed with a source at the wavelength $\lambda_1$, the undistorted slit image will be located as shown at Io in FIGS. 6 and 7. If the same hologram is viewed with a source of wavelength $\lambda_2 \neq \lambda_1$, the slit image will be located in the surface defined by the choice of $\theta_2$ as illustrated in FIGS. 6 and 7 in a region determined by the choice of $\lambda_2$. Referring to FIG. 7, the new slit image will subtend the same angle $\Phi$ from the origin as the image Io, but will be smaller if $\lambda_2 > \lambda_1$, and larger if $\lambda_2 < \lambda_1$. When the hologram is viewed with a white light source, the object may be viewed over a zone in which it appears in the color determined by $\lambda_1$, when the viewer is looking through the image at Io, and becomes bluer or redder as the viewer moves farther or nearer to the origin, respectively, in the slit image zone defined by $\lambda_1/\lambda_2$, $\theta_2$ and $\Phi$.

In particular, more or less arbitrarily choosing 400 nanometers (400 nm) and 700 nm as boundaries of the visible spectrum from blue to red, if $\lambda_1$ is 514 nm, Io in FIG. 7 is the slit image through which the object can be seen in green light at 514 nm. The slit image corresponding to 400 nm will be centered at $I_1$ in FIG. 7, and the slit image corresponding to 700 nm will be centered at $I_2$.

Similarly, if the image was recorded at 480 nm, the 480 nm slit image would be at Io, and the 400 nm and 700 nm images would be centered at $I_3$ and $I_4$, respectively. Corresponding images recorded at 633 nm would be at Io for 633 nm, $I_5$ for 400 nm, and $I_6$ for 700 nm.

An undistorted image in full color can be provided by recording three holographic images in sequence on the same photographic plate using a different wavelength $\lambda_1 r$ in the red, $\lambda_1 g$ in the green, and $\lambda_1 b$ in the blue for each recording. Upon processing and viewing of such an image with white light, three overlapping image zones, such as illustrated in FIG. 7, would be formed. Through the slit image location Io, an undistorted polychromatic image could be viewed. Hue of any particular color in the object would vary, and perspective distortion would appear, as the viewer moved away from Io in the viewing zone.

The color balance in the image at Io would be determined by the choice of the three recording wavelengths $\lambda_1 r$, $\lambda_1 g$ and $\lambda_1 b$, by the relative exposures given, and by the spectral distribution in the viewing source.

If desired, color balance in polychromatic images recorded as just described can be modified somewhat from that attainable with a particular set of available recording wavelengths $\lambda_1 r$, $\lambda_1 g$ and $\lambda_1 b$ without resort to tunable lasers. The wavelength of the image seen through Io for $vo=1$ can be shifted from $\lambda_1$ to $\lambda_2$ by a different choice of r. From Equation (7), if $i=\infty$ and $vo=1$, $$\frac{1}{r} = \frac{\lambda_1}{\lambda_2} + 1 \quad (7d)$$

Also, from Equation (13)

$$\frac{\lambda_1}{\lambda_2} = \frac{\sin\theta_2 - \sin\theta_1}{\sin\theta_5 - \sin\theta_3} \quad (13b)$$

For recording at any one wavelength, these equations indicate that the wavelength at Io could be shifted from $\lambda_1$ to $\lambda_2$ without distortion by making corresponding changes in r and $\theta_5$. For polychromatic superposed recordings, the wavelengths at Io could be shifted from $\lambda_1 r$, $\lambda_1 g$ and $\lambda_1 b$ to $\lambda_2 r$, $\lambda_2 g$ and $\lambda_2 b$, respectively, without distortion or blur in the image only if $$\frac{\lambda_1 r}{\lambda_2 r} = \frac{\lambda_1 g}{\lambda_2 g} = \frac{\lambda_1 b}{\lambda_2 b} \quad (20)$$

In other words, the undistorted image could be made redder or bluer by a common choice of $r \neq \frac{1}{2}$, $\theta_5 \neq \theta_2$. Minor shifts not in accordance with Equation (20) could be made with a corresponding reduction in effective slit height by allowing small changes in $\theta_5$ for the superposed images, or allowing $\theta_2$ to vary slightly from $-\theta_1$ with a corresponding blurring from different distortions of the image.

Of considerable importance where images of scenes of appreciable size or depth are to be recorded at relatively close distances, as in the 1:1 case illustrated in FIGS. 1 and 2, is the discovery that orthoscopic views provided in the manner described above do not show the proportions of the aerial image, which may be considerably distorted, but that of the original scene.

Having thus described the invention, what I claim is:

1. A process of making holographic images comprising the steps of recording a hologram of a parallax limited aerial image formed by a lens on a first side of a recording surface with a reference beam directed toward the surface from a source on said first side of said surface at an angle of incidence to the recording surface equal and opposite to the angle of incidence of the optical axis of the lens to the recording surface, and illuminating the hologram with a nonconverging beam of light directed toward the hologram from a source on a second side of said surface opposite said first side.

2. The process of claim 1, in which said illuminating beam is directed along said optical axis relative to the hologram.

3. The process of claim 2, in which said illuminating beam is collimated.

4. The process of claim 2, in which said illuminating beam is diverging.

5. A process of making holographic images comprising the steps of recording a hologram of an aerial image formed by a lens having an aperture limited to an elongated slit on a recording surface with a reference beam at an angle of incidence to the recording surface equal and opposite to the angle of incidence of a ray from the center of the slit to the center of the recording surface, and illuminating the hologram with a beam of diverging or collimated light directed toward the side of said surface opposite the side confronting the lens during recording.

6. The process of claim 5, in which the illuminating beam is at an angle of incidence equal to the angle of incidence of said ray.

7. A method of forming an orthoscopic holographic image of an object with a lens having an aperture limited to an elongated slit, a source of monochromatic light, a photographic plate, and a source of white light, comprising the steps of arranging the lens between the object and plate with a line from the center of the slit intersecting the center of the plate at a first angle of incidence to the plate and in position to form an aerial image of the object intersecting the plate, dividing a beam of light from the monochromatic source into a beam illuminating the object and a reference beam, focusing the reference beam to form a reference source at a distance from the plate less than the distance from the center of the slit to the plate and having a central ray incident on said plate on the same side as the lens at a second angle of incidence equal and opposite to said first angle of incidence, processing the plate to form a hologram, and illuminating said hologram with a diverging or parallel beam from said white light source from the side opposite that on which the hologram was recorded at an angle of incidence equal to said first angle of incidence to form a real image of said elongated aperture substantially equal in size to said elongated aperture through which an orthoscopic image of said object can be viewed in light of the wavelength of said monochromatic source in an image zone through which orthoscopic images of said object can be viewed in a wavelength that is a function of the position of the observer in the viewing zone.

8. A method of forming an orthoscopic holographic image of an object with a lens having an aperture limited to an elongated slit, a source of monochromatic light, a photographic plate, and a source of white light, comprising the steps of arranging the lens between the object and the plate with a line from the center of the slit intersecting the plate at a first angle of incidence to the plate and the lens in position to form an aerial image of the object intersecting the plate, dividing a beam of light from the monochromatic source into a beam illuminating the object and a reference beam, focusing the reference beam to form a reference source at a distance from the plate less than the distance from the center of the slit to the plate and incident on said plate on the same side as the lens, processing the plate to form a hologram, and illuminating said hologram with a beam from said white light source from the side opposite that on which the hologram was recorded to form a real image of said elongated aperture through which an orthoscopic image of said object can be viewed in light of the wavelength of said monochromatic source in an image zone through which orthoscopic images of said object can be viewed in a spectrum of wavelength which is a function of the position of the observer in the viewing zone.

9. A method of forming an orthoscopic holographic image of an object with a lens having an elongated parallax limiting aperture, a source of monochromatic light, a photographic plate, and a source of white light, comprising the steps of arranging the lens between the object and the plate with its optical axis intersecting the plate at a first angle of incidence to the plate and in position to form an aerial image of the object intersecting the plate, dividing a beam of light from the monochromatic source into a beam illuminating the object and a reference beam, focusing the reference beam to form a reference source at a distance from the plate less than the distance from the elongated aperture to the plate and having a central ray incident on said plate on the same side as the lens at a second angle of incidence equal and opposite to said first angle of incidence, processing the plate to form a hologram, and illuminating said hologram with a diverging or parallel beam from said white light source from the side opposite that on which the hologram was recorded at an angle of incidence equal to said first angle of incidence to form a real image of said elongated aperture substantially equal in size to said elongated aperture through which an orthoscopic image of said object can be viewed in light of the wavelength of said monochromatic source in an image zone through which orthoscopic images of said object can be viewed in a wavelength that is a function of the position of the observer in the viewing zone.

10. A process of making holographic images, comprising the steps of holographically recording a parallax limited aerial image of an object illuminated with a source of monochromatic light formed by a lens on a recording surface with a reference beam from said source at an angle of incidence to said surface equal and opposite to the angle of incidence of the optical axis of the lens to said surface, and illuminating said recorded image from the side opposite that on which it was recorded with a beam directed along the direction of said optical axis relative to said surface during recording.

11. A method of forming an orthoscopic holographic image of an object, comprising the steps of holographically recording on a photographic plate a parallax limited image of the object formed by a lens having an optical axis at a first angle of incidence to said photographic plate, said plate being intersected by said image, using a reference beam propagated along a reference axis at a second angle of incidence equal and opposite to said first angle of incidence, processing said plate to form a hologram, and illuminating said hologram with a reference beam directed along said optical axis relative to said plate.

12. A method of forming an orthoscopic holographic image of an object with a lens having an elongated parallax limiting aperture, a source of monochromatic light, a photographic plate, a mirror, and a source of white light, comprising the steps of arranging the mirror between the object and the lens and the lens between the mirror and the plate with the optical axis of the lens intersecting the plate at a first angle of incidence to the plate and in position to form an aerial image of the object intersecting the plate from the virtual image of the object in the mirror, dividing a beam of light from the monochromatic source into a beam illuminating the object and a reference beam, focusing the reference beam to form a reference source at a distance from the plate less than the distance from the elongated aperture to the plate and having a central ray incident on said plate on the same side as the lens at a second angle of incidence equal and opposite to said first angle of incidence, processing the plate to form a hologram, and illuminating said hologram with a diverging or parallel beam from said white light source from the side opposite that on which the hologram was recorded at an angle of incidence equal to said first angle of incidence to form a real image of said elongated aperture substantially equal in size to said elongated aperture through which an orthoscopic image of said object can be viewed in light of the wavelength of said monochromatic source in an image zone through which orthoscopic images of said object can be viewed in a wavelength that is a function of the position of the observer in the viewing zone.

13. A process of making holographic images, comprising the steps of holographically recording a parallax limited aerial image of the virtual image in a mirror of an object illuminated with a source of monochromatic light formed by a lens on a recording surface with a reference beam from said source at an angle of incidence to said surface equal and opposite to the angle of incidence of the optical axis of the lens to said surface, and illuminating said recorded image from the side opposite that on which it was recorded with a beam directed along the direction of said optical axis relative to said surface during recording.

14. A method of forming an orthoscopic holographic image of an object, comprising the steps of holographically recording on a photographic plate a parallax limited aerial image of the object formed by a lens from a mirror image of the object, said lens having an optical axis at a first angle of incidence to said photographic plate, said plate being intersected by said aerial image, using a reference beam propagated along a reference axis at a second angle of incidence equal and opposite to said first angle of incidence, processing said plate to form a hologram, and illuminating said hologram with a reference beam directed along said optical axis relative to said plate and propagated toward the plate from the side opposite the side confronting the lens during recording.

15. The process of making holographic images of an object with a lens having an aperture limited to an elongated slit, comprising the steps of placing the lens in position to form an aerial image of the object, placing a photographic plate in a position in which it would intersect an aerial image of the object formed by the lens with a point O in the center of the plate at a distance S from the center of the slit and with a ray from the center of the slit at an angle $\theta_1$ to the normal to the plate at point O, making a holographic exposure by illuminating the object with a source of monochromatic light of wavelength $\lambda_1$ while illuminating the plate with a reference beam from said source formed as a point source at a distance R from the point O on the same side of the plate as the lens and in the plane of said normal and said ray and on the other side of said normal from said ray and at an angle $\theta_2$ to said normal, where $\theta_2 = -\theta_1$ and $O<(R/S)<1$, processing said plate to make a hologram, and illuminating said hologram with a source of white light at a distance I from the plate and on the opposite side of the plate from the side on which said lens and reference point source were located during said holographic exposure at an angle of incidence $\theta_3$ to said normal to form a real image of said slit through which an undistorted orthoscopic image of said object can be seen in a light of wavelength $\lambda_2$, which slit image is located at a distance S from said slit and at an angle $\theta_5$ to said normal, where $$\frac{1}{I} = \frac{\lambda_2}{\lambda_2}\left(\frac{1}{R} - \frac{1}{S}\right) - \frac{1}{S}$$

and $\sin\theta_5 = (2\lambda_2/\lambda_1)\sin\theta_2 + \sin\theta_3$, the angles $\theta_i$ being considered positive or negative according as a rotation in one sense or an opposite sense would carry the ray into said normal, respectively.

16. The process of claim 15 in which $I=\infty$, $\lambda_1=\lambda_2$ and $O<(R/S)\leq\frac{1}{2}$.

17. The process of claim 15, in which $\theta_1=\theta_3$.

18. The process of claim 17, in which $I=\infty$, $\lambda_1=\lambda_2$ and $O<(R/S)=\frac{1}{2}$.

19. A method of forming a polychromatic orthoscopic holographic image of an object with a lens having an aperture limited to an elongated slit, a plurality of sources of monochromatic light at different wavelengths, a photographic plate, and a source of white light, comprising the steps of arranging the lens between the object and the plate with a line from the center of the slit intersecting the center of the plate at a first angle of incidence to the plate and in position to form an aerial image of the object intersecting the plate, dividing beams of light from the monochromatic sources into beams illuminating the object and reference beams, focusing the reference beams to form reference sources each at a common distance from the plate less than the distance from the center of the slit to the plate and each having a central ray incident on said plate on the same side as the lens at a second angle of incidence equal and opposite to said first angle of incidence, processing the plate to form a hologram, and illuminating said hologram with a diverging or parallel beam from said white light source from the side opposite that on which the hologram was recorded at an angle of incidence equal to said first angle of incidence to form a real image of said elongated aperture substantially equal in size to said elongated aperture through which a polychromatic othoscopic image of said object can be viewed.

20. A method of forming a polychromatic orthoscopic holographic image of an object with a lens having an aperture limited to an elongated slit, a plurality of sources of monochromatic light at different wavelengths, a photographic plate, and a source of white light, comprising the steps of arranging the lens between the object and the plate with a line from the center of the slit intersecting the plate at a first angle of incidence to the plate and the lens in position to form an aerial image of the object intersecting the plate, dividing beams of light from the monochromatic sources into beams illuminating the object and reference beams, focusing the reference beams to form reference sources at a common distance from the plate less than the distance from the center of the slit to the plate and incident on said plate on the same side as the lens at a common angle of incidence, processing the plate to form a hologram, and illuminating said hologram with a beam from said white light source from the side opposite that on which the hologram was recorded to form a real image of said elongated aperture through which an image of said object can be viewed in light of a plurality of wavelengths in an image zone through which images of said object can be viewed in colors which are a function of the position of the observer in the viewing zone.

* * * * *